(12) United States Patent
Miller

(10) Patent No.: US 8,995,960 B2
(45) Date of Patent: Mar. 31, 2015

(54) MOBILE DEVICE AUTHENTICATION

(71) Applicant: Dedo Interactive, Inc., Plano, TX (US)

(72) Inventor: Mark F. Miller, Wylie, TX (US)

(73) Assignee: Dedo Interactive, Inc., Plano, TX (US)

(*) Notice: Subject to any disclaimer, the term of this patent is extended or adjusted under 35 U.S.C. 154(b) by 0 days.

(21) Appl. No.: 13/763,088

(22) Filed: Feb. 8, 2013

(65) Prior Publication Data

US 2013/0244615 A1    Sep. 19, 2013

Related U.S. Application Data

(60) Provisional application No. 61/597,564, filed on Feb. 10, 2012.

(51) Int. Cl.
*H04M 1/66*  (2006.01)
*H04M 1/68*  (2006.01)
*H04M 3/16*  (2006.01)
*H04W 12/06* (2009.01)

(52) U.S. Cl.
CPC .................................... *H04W 12/06* (2013.01)
USPC ......................... 455/411; 455/41.2; 455/41.3

(58) Field of Classification Search
USPC ........................ 455/41.2, 41.3, 411
See application file for complete search history.

(56) References Cited

U.S. PATENT DOCUMENTS

| 7,257,374 | B1* | 8/2007 | Creigh ........................ 455/41.2 |
| 7,403,743 | B2* | 7/2008 | Welch ........................ 455/41.1 |
| 8,270,946 | B2* | 9/2012 | Yamada ...................... 455/410 |
| 2004/0077313 | A1* | 4/2004 | Oba et al. .................. 455/41.2 |
| 2009/0193514 | A1* | 7/2009 | Adams et al. ................. 726/17 |
| 2010/0081414 | A1* | 4/2010 | Poisner ...................... 455/411 |
| 2011/0111698 | A1* | 5/2011 | Odakura ..................... 455/41.2 |
| 2012/0252480 | A1* | 10/2012 | Krutt et al. ................ 455/456.1 |

* cited by examiner

Primary Examiner — Charles Appiah
Assistant Examiner — Jaime Holliday
(74) Attorney, Agent, or Firm — Westman, Champlin & Koehler, P.A.; Theodore M. Magee

(57) ABSTRACT

A mobile device has an authentication module that detects a proximity-based authentication component and unlocks sensitive areas of the mobile device when the proximity-based authentication component is within a desired proximity of the mobile device. If the proximity-based authentication component is not within the desired proximity of the mobile device, the mobile device automatically locks the secured areas of the mobile device. The proximity-based authentication component is separate from the mobile device in that it is not inserted or slid within the mobile device, or in any way attached to the mobile device, in order to be used.

10 Claims, 6 Drawing Sheets

MOBILE DEVICE AUTHENTICATION

CROSS-REFERENCE TO RELATED APPLICATION

The present application is based on and claims the benefit of U.S. provisional patent application Ser. No. 61/597,564, filed Feb. 10, 2012, the content of which is hereby incorporated by reference in its entirety.

BACKGROUND

Mobile devices are currently gaining wide popularity. Some mobile devices include cellular telephones, smart phones, and tablet or pad-based computers. Some mobile devices connect to a mobile communication network which could be a cellular network, a voice over IP (VOIP) network or a satellite communication network.

Current mobile devices are not only used for communication, but are also used to run applications and process many different types of data. Some of the applications and data that can be used on a mobile device, or some of the actions that can be performed on a mobile device (such as making financial payments, etc.) are sensitive and confidential. Therefore, a user may desire these types of information, or these types of actions, to be secured.

There have been a number of different mechanisms employed to secure information or actions on a mobile device. One common mechanism is to require the user to key in a password on a hardware keypad on the mobile device or on a software keypad displayed on a touch sensitive screen. Another mechanism is a fingerprint scan. This requires the user to place his or her finger on a fingerprint scan area of the mobile device to have the user's fingerprint scanned. Still other mechanisms include keys or other mechanical mechanisms which are mechanically inserted into a slot or port in the mobile device. When the key is properly inserted, it acts to authenticate the user to the mobile device and it unlocks the sensitive or secure information or actions on the mobile device.

All of these different types of mechanisms have drawbacks. All of them require the user to physically interact with a mobile device in order to authenticate himself or herself to the device so that the secure areas of the mobile device (the secure information or secure actions) can be accessed. In addition, once the user has authenticated himself or herself to the mobile device, the user can walk away and accidently leave the mobile device behind, in an unsecured state. Anyone coming after the user can then simply pick up the mobile device and access all of the secured areas of the mobile device.

The discussion above is merely provided for general background information and is not intended to be used as an aid in determining the scope of the claimed subject matter.

SUMMARY

A mobile device has an authentication module that detects a proximity-based authentication component and unlocks sensitive areas of the mobile device when the proximity-based authentication component is within a desired proximity of the mobile device. If the proximity-based authentication component is not within the desired proximity of the mobile device, the mobile device automatically locks the secured areas of the mobile device. The proximity-based authentication component is separate from the mobile device in that it is not inserted or slid within the mobile device, or in any way attached to the mobile device, in order to be used.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
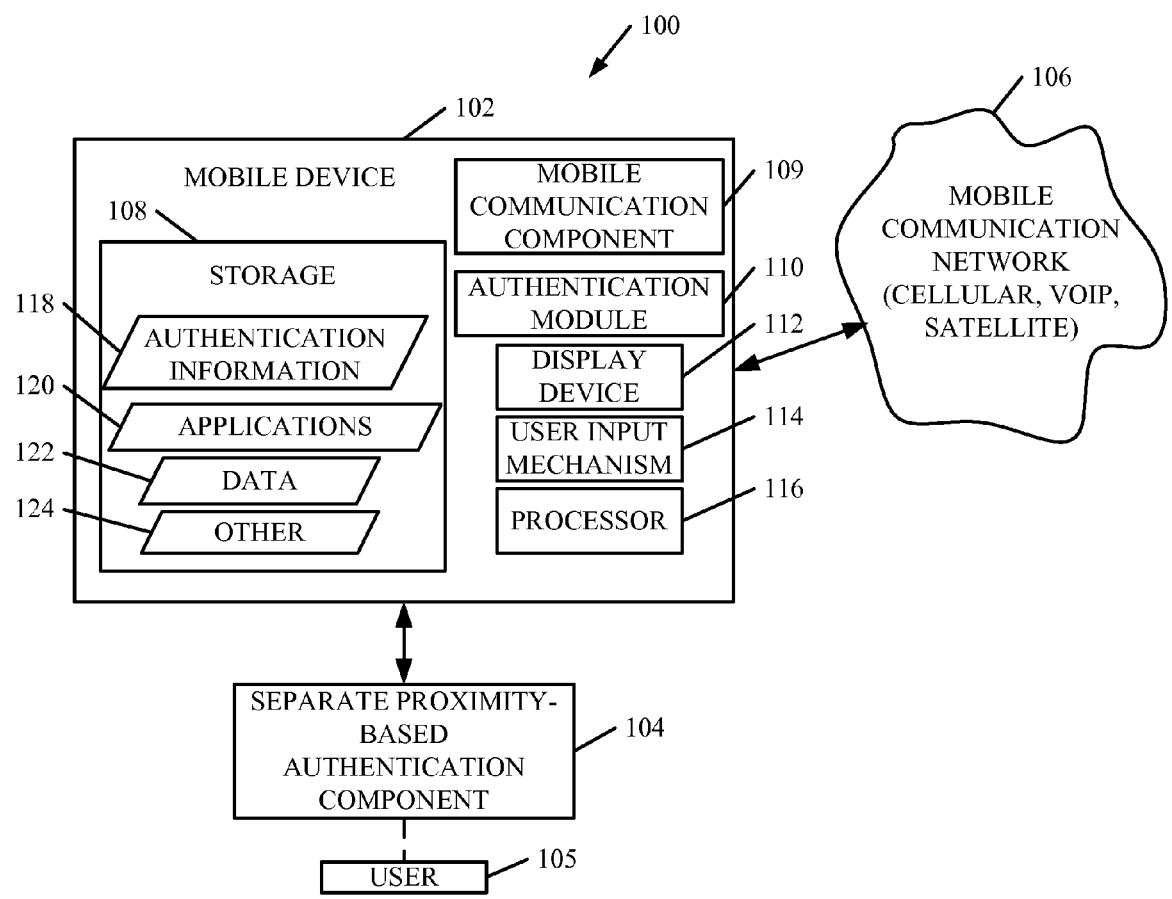
FIG. 1 is a block diagram of one illustrative authentication architecture.

FIG. 1 is a block diagram of one illustrative authentication architecture 100. Architecture 100 illustratively includes mobile device 102 and a separate, proximity-based authentication component 104. Architecture 100 shows that mobile device 102 is illustratively a communication device that can communicate using a mobile communication network 106. In one embodiment, network 106 is a cellular telephone network, a VOIP network, a satellite network, etc.

FIG. 1 also shows that mobile device 102 illustratively includes storage 108, mobile communication component 109, authentication module 110, display device 112, user input mechanisms 114 and processor 116. Of course, this is exemplary only and other or different components can be used in mobile device 102 as well.

Storage 108 is illustratively a hardware memory device that stores information used by the other components or modules of mobile device 102. In the embodiment shown, storage 108 includes authentication information 118, one or more applications 120, other data 122, and other information 124 that can be stored. Storage 108 can be used to store computer readable instructions which, when executed by processor 116, cause processor 116 to perform steps. Storage 108 is illustratively a hardware storage medium that stores the instructions for access by processor 116. Authentication module 110, or parts of it, can comprise instructions stored in storage 108 as well.

Mobile communication component 109 is illustratively a transceiver that can communicate over network 106. Of course, there are a wide variety of components that can be used as component 109.

Processor 116 is illustratively a computer processor with associated memory and timing circuitry (not separately shown). In one embodiment, processor 116 is a functional component of mobile device 102 and is activated by, and facilitates the functionality of, other devices, mechanisms and modules or other components of mobile device 102.

Display device 112 is illustratively a user interface display screen that displays user interface displays to a user. Display device 112 can, for example, be a touch sensitive screen, or another display device for displaying information.

User input mechanisms 114 can take a wide variety of different forms. For instance, the user input mechanisms can be keys on a keypad, sensors on a touch sensitive screen, speech recognition components for recognizing voice commands, displayed user actuable input mechanisms, such as buttons, menus, links, scroll actuators or other displayed items displayed on a touch sensitive screen or another type of user display device which can be actuated by the user either through touch, or through appropriate key inputs, point and click devices or in other ways, etc.

Authentication module 110 illustratively generates user interface displays on display device 112 that allow a user to select a type of authentication that is to be used with mobile device 102. Authentication module 110 also illustratively includes components for implementing security or authentication measures, once the user has selected a desired authentication mechanism and assigned it to secured areas of mobile device 102. By a secured area it is meant that the user can assign security to (or require authentication to access) one or more of a wide variety of different types of information on the mobile device 102. It is also meant that the user can assign security to (or require authentication for) performing various actions using mobile device 102. In any case, once authentication module 110 has walked the user through a process by which the user selects a desired authentication mechanism, authentication module 110 implements the security associated with that authentication mechanisms as well.

In the embodiment shown in FIG. 1, the authentication mechanisms the user can choose include a separate, proximity-based authentication component 104. In one embodiment, component 104 communicates with authentication module 110 or is readable by authentication module 110, when component 104 is within a predetermined proximity of authentication module 110. For instance, where the separate proximity-based authentication component 104 is a radio frequency identification component (an RFID component), authentication module 110 can read information from component 104 when component 104 is within a range of an RFID reader that comprises part of authentication module 110. Similarly, when separate, proximity-based authentication component 104 is a near field communication (NFC) component, authentication module 110 includes an NFC circuit that can exchange information with component 104 when component 104 is within a predetermined proximity of authentication module 110 (e.g., within several inches). In any case, once the user has assigned security to sensitive areas of mobile device 102, then those areas can only be unlocked when component 104 is within the predetermined proximity of mobile device 102.

It will be noted that, in accordance with one embodiment, component 104 is not insertable within, slidable within, or otherwise attached to, mobile device 102 in order to unlock the secured areas of mobile device 102. Instead, component 104 is illustratively carried by the user 105. In this way, if the user 105 leaves mobile device 102, mobile device 102 will automatically lock the secured areas of mobile device 102 once the user 105 (and hence component 104) has left the predetermined proximity of mobile device 102. Thus, for instance, component 104 can be incorporated into a badge, a piece of jewelry, a wrist watch, an item carried in the user's wallet or purse, an item of clothing, user's eyeglasses, or it can be any other item that is illustratively carried with user 105.

It will also be noted that authentication module 110 can implement multi-factor security. For instance, multi-factor security is a type of security or authentication that requires multiple different security mechanisms input by the user. By way of example, in one embodiment, the user must bring authentication component 104 within the predetermined proximity of mobile device 102 in order to unlock the functionality of mobile device 102. Then, in order to access sensitive information on mobile device 102, the user may be required to perform additional authentication steps (such as to key in a password, speak a password, provide a fingerprint scan, etc.). However, for the sake of the present discussion, single factor authentication will be discussed, but this is for the sake of example only.

Figure 2:
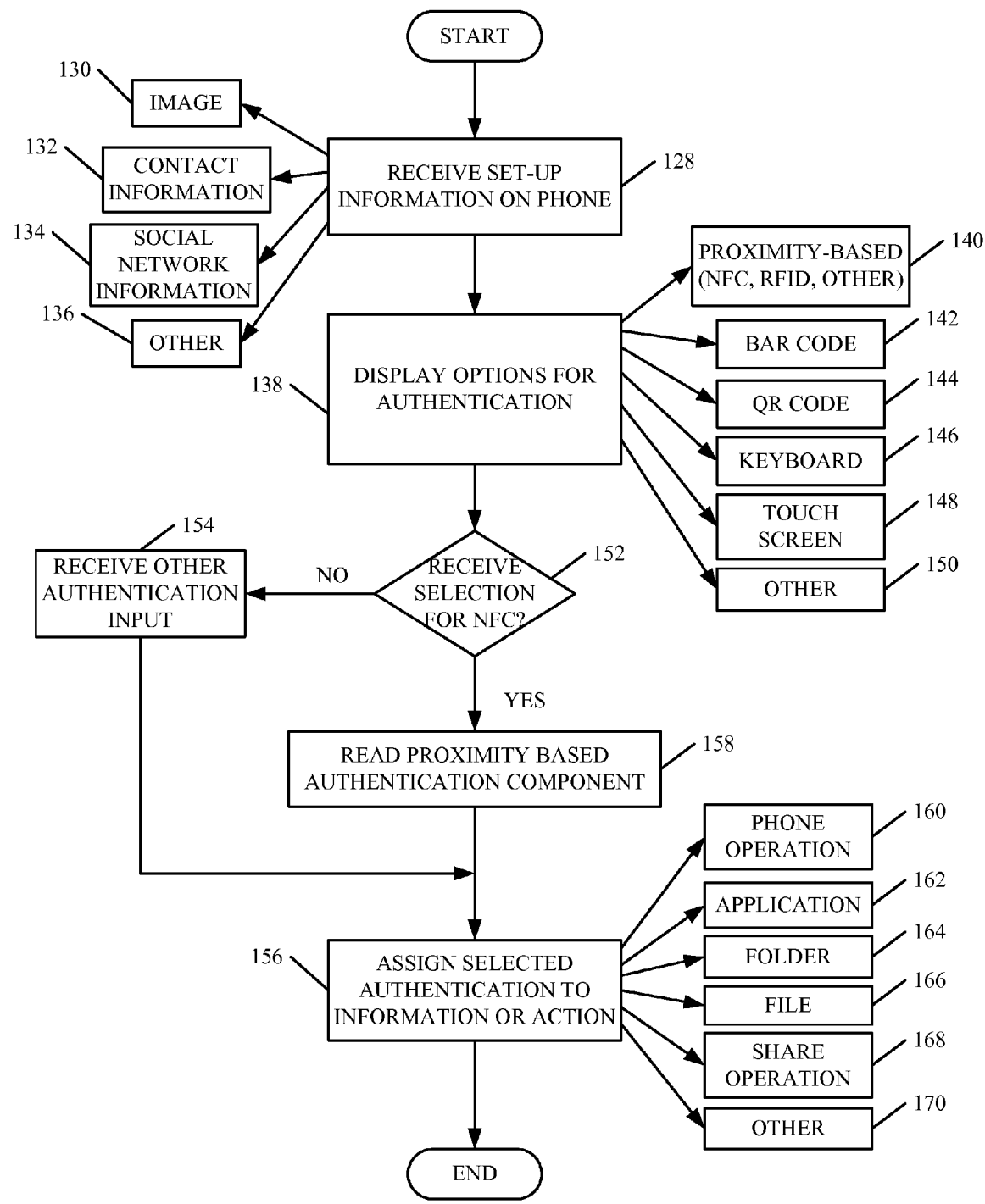
FIG. 2 is a flow diagram illustrating one embodiment for setting proximity-based authentication on a mobile device.

FIG. 2 is a flow diagram illustrating one embodiment of the overall operation of architecture 100 shown in FIG. 1 in assigning a selected authentication mechanism to secured areas of mobile device 102. In FIG. 2, mobile device 102 first generates displays that allow a user 105 to input setup information into device 102. Receiving the setup information at mobile device 102 is indicated by block 128 in FIG. 2.

Setup information can, of course, include a wide variety of different types of information. For instance, the setup information can include an image (such as a photograph or picture of user 105) as indicated by block 130. The setup information can also include contact information 132 (such as an email address, an alternate telephone number, various other communication information, address information, etc.) Similarly, the setup information can include social network information 134, such as a social network user name and password, or other social network information. Of course, the setup information can include a wide variety of different, or additional, information as well, and this is indicated by block 136.

After the user has setup the phone, authentication module 110 illustratively generates user interface displays on display device 112 that allow user 105 to select an authentication option for use on mobile device 102. As is briefly described above, if multi-factor authentication or security is used, the user can illustratively repeat the process to set up the multiple security factors, as desired. Displaying the options for authentication is indicated by block 138.

The authentication options illustratively include a proximity-based option 140, such as a near field communication component, an RFID component, or another proximity-based component 104. The authentication options can also include a bar code option 142 in which the user would carry a barcode that is read by a barcode scanner on mobile device 102. The authentication options can include a matrix barcode (or two-dimensional code), sometimes referred to as a QR code 144. Like the barcode 142, the QR code 144 can be carried by the user and read by a QR code reader on mobile device 102. The authentication options can include a keyboard option 146 which allows the user to input a series of keystrokes as a password. It can also include a touch screen option 148 which allows the user to provide authentication information though a touch screen. This can include providing keystrokes on a virtual keyboard displayed on the touch screen, or putting in other patterns (such as tracing a pattern on the touch screen), touching various spots on the touch screen in a selected order, etc. Of course, there can be other authentication options 150 as well.

The option that will be discussed at greatest length herein is the proximity-based option. Therefore, authentication module 110 determines whether the user has selected the proximity-based option 140. This is indicated by block 152 in FIG. 2. If not, then authentication module 110 instructs the user to provide the other authentication input (such as the barcode, the QR code, the password, the touch screen input, etc.), whatever was selected by the user 105. This is indicated by block 154 in FIG. 2. Once the user has input that information, the password, touch screen input, QR code, barcode, etc. can then be assigned to secured areas of the cell phone (such as to secured information or actions on the cell phone). This is indicated by block 156.

However, if, at block 152, authentication module 110 has determined that the user 105 has selected the proximity-based option 140, then authentication module 110 generates user interface displays on display device 112 that instruct the user to bring the proximity-based component 104 within the predefined proximity of mobile device 102, and authentication module 110 reads the proximity-based component 104. For instance, if the proximity-based component 104 is an RFID tag, authentication module 110 reads the RFID tag. If the component 104 is a NFC chip, then authentication module 110 communicates with the NFC chip. Reading the proximity-based authentication component is indicated by block 158.

Once the authentication component has been read, processing continues at block 156 where the authentication information read from the authentication component 104 is assigned to the secured areas of the mobile device. Again, these areas can include various aspects of the mobile device operation, as indicated by block 160. The authentication information can be assigned to applications 162, folders 164, individual files or other items of information 166 or to individual operations of mobile device 102, such as operations that allow user 105 to share information from mobile device 102, or others. This is indicated by block 168. Of course, the authentication information can be assigned to other items as well (such as payment operations, accessing bank accounts, other information, etc.), and this is indicated by block 170.

Figure 3:
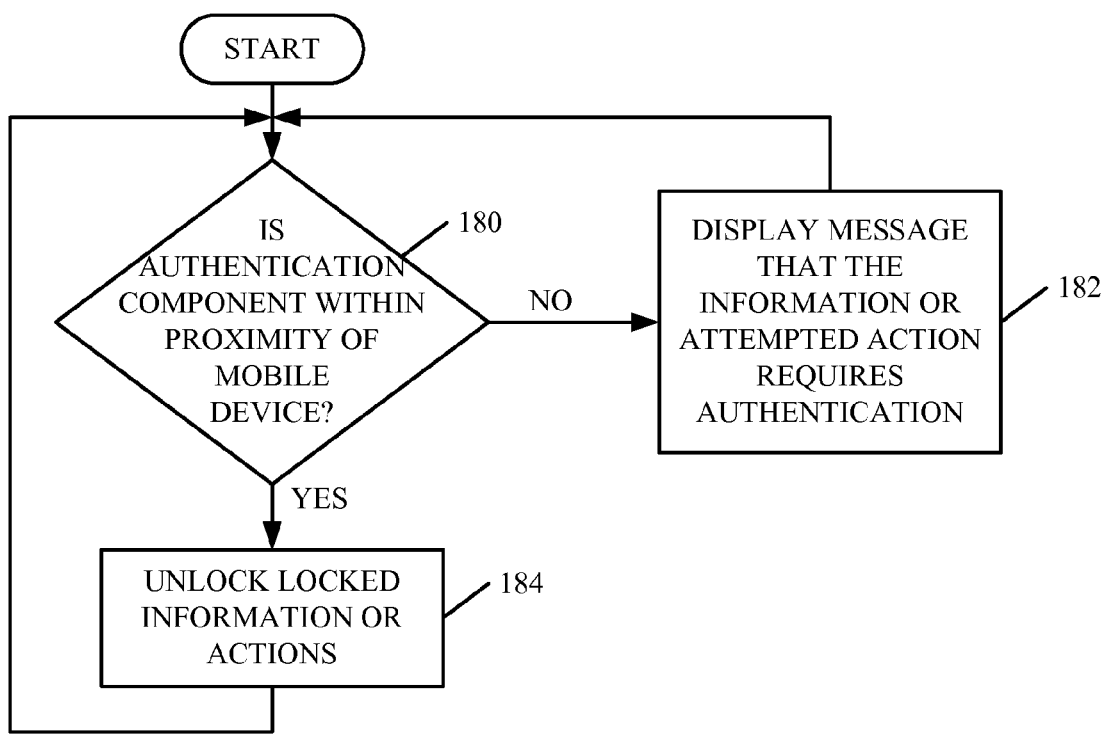
FIG. 3 is a flow diagram illustrating one embodiment of the operation of the mobile device in use, once authentication has been set on the mobile device.

FIG. 3 is a flow diagram illustrating one embodiment of the operation of architecture 100. The user has assigned proximity-based authentication to one or more secured areas (data, software or operations) of mobile device 102. When mobile device 102 is started, or otherwise during its operation, authentication module 110 intermittently determines whether the authentication component 104 is within the desired proximity of mobile device 102. This is indicated by block 180. Authentication module 110 can do this on a periodic basis, such as after a predetermined amount of time has lapsed. Module 110 can also perform this operation based on certain actions input by the user. For instance, if the user attempts to access one of the secured areas of mobile device 102, authentication module 110 can perform the operation at that time. Of course, authentication module 110 can make this determination at other times or in response to other actions as well.

In any case, if authentication module 110 determines that the separate proximity-based authentication component 104 is not within the desired proximity of mobile device 102, then authentication module 110 generates a display on display device 112 displaying a message that the information or attempted action requires authentication. This is indicated by block 182. This will prompt user 105 to bring the separate, proximity-based authentication component 104 within the predefined proximity of mobile device 102 for authentication so that mobile device 102 will unlock the secured areas of mobile device 102.

However, if, at block 180, authentication module 110 determines that separate, proximity-based authentication component 104 is within the predefined proximity of mobile device 102, then it unlocks the locked information or actions (or secured areas) of mobile device 102 so that the user can access them. This is indicated by block 184.

This provides a number of advantages. For instance, once user 105 has gone through the authentication selection process and assigned authentication to various secured areas of mobile device 102, the user 105 need not interact physically with mobile device 102 at all, in order to access those secured areas. By way of example, if component 104 is an RFID card or an NFC transmitter, and the user is carrying that on his or her person in an area where it will be within the predetermined proximity of mobile device 102, mobile device 102 will automatically unlock the secured areas of mobile device 102 so that the user need not even provide any authenticating information or actions in order to access the secured areas. By contrast, if the user sets mobile device 102 down and walks away, so that component 104 is outside the predetermined proximity of mobile device 102, mobile device 102 automatically locks the secured areas of mobile device 102 which require component 104 for authentication. If the user 105 then re-approaches mobile device 102, bringing component 104 within the predetermined proximity, mobile device 102 automatically again unlocks the secured areas of mobile device 102. By automatically it is meant that the user need not physically interact with the mobile device 102 for authentication. FIGS. 3A-3I show a series of user interface displays on a mobile device (e.g., a smart phone) 200. In the embodiment shown, smart phone 200 has a touch sensitive screen 202 which can be used to display information. Before describing each display in more detail, it will be noted that FIGS. 3A-3H illustrate exemplary user interface displays that can be displayed to walk user 105 through the operation of selecting proximity-based authentication for secured areas of phone 200. The user interface display in FIG. 3I is one example of a message that can be displayed when the user has attempted to access secured areas of telephone 200, without component 104 being in the predefined proximity of telephone 200.

Figure 3A:
FIGS. 3A-3I show one embodiment of user interface displays generated on a mobile device.
Figure 3B:
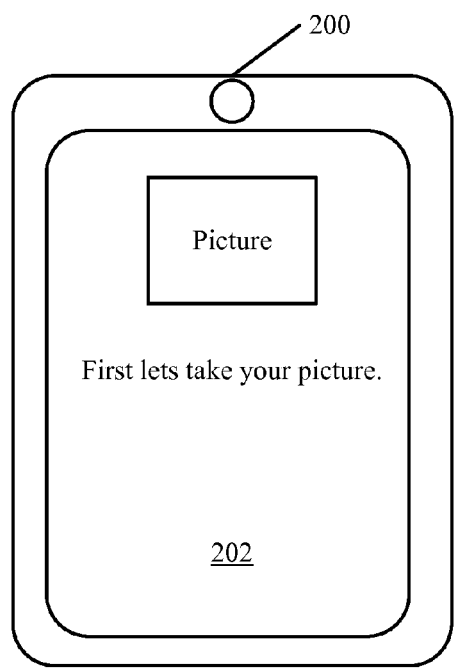
Figure 3C:
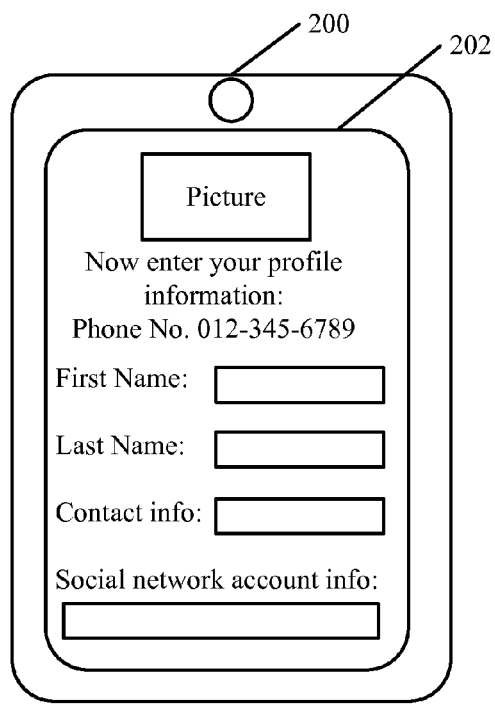
Figure 3D:
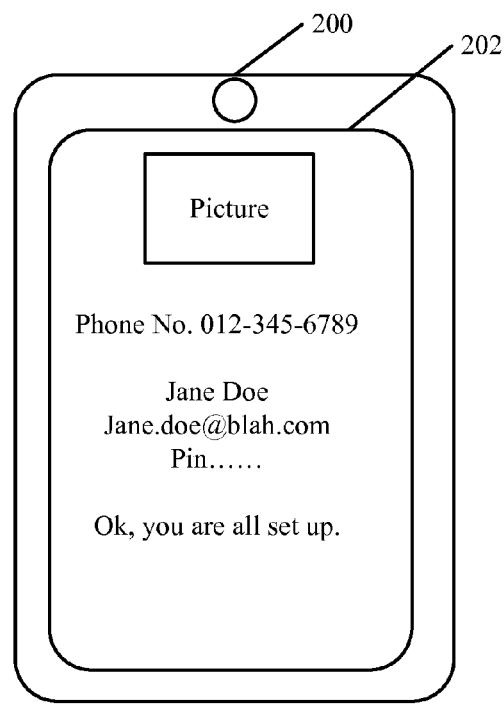

FIG. 3A is a display that displays a welcome message such as "Hi. Welcome to your new phone. We will help you set it up." FIGS. 3B-3D allow the user to input setup information. For instance, FIG. 3B instructs the user to take a picture or other image to be associated with user 105. FIG. 3C instructs the user to enter information such as name, contact information, and social network account information. FIG. 3D displays the setup information, as it has been entered by user 105.

Figure 3E:
Figure 3F:
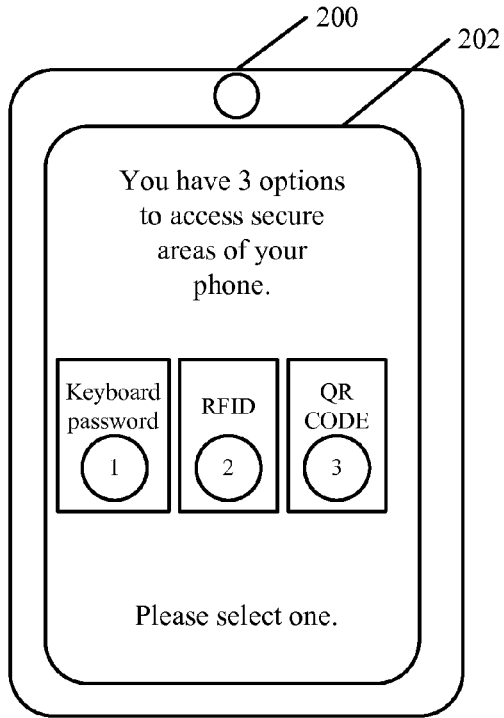

FIG. 3E shows a user interface display that can be used to instruct the user that he or she is about to enter the authentication process by which the user assigns security or authentication options to phone 200. FIG. 3F displays three different authentication options which were briefly discussed above. The first option is the keyboard password option, the second is an RFID option, and the third is a QR code option. The user interface display 200 instructs the user to select one of the options. In the embodiment where the user interface display is a touch sensitive screen, the user simply needs to touch one of the options 204, 206, or 208. Of course, where screen 202 is not a touch sensitive screen, the user can illustratively use arrow keys, a thumb pad, a scroll bar, or another input mechanism to select and actuate options 204, 206 or 208.

Figure 3G:
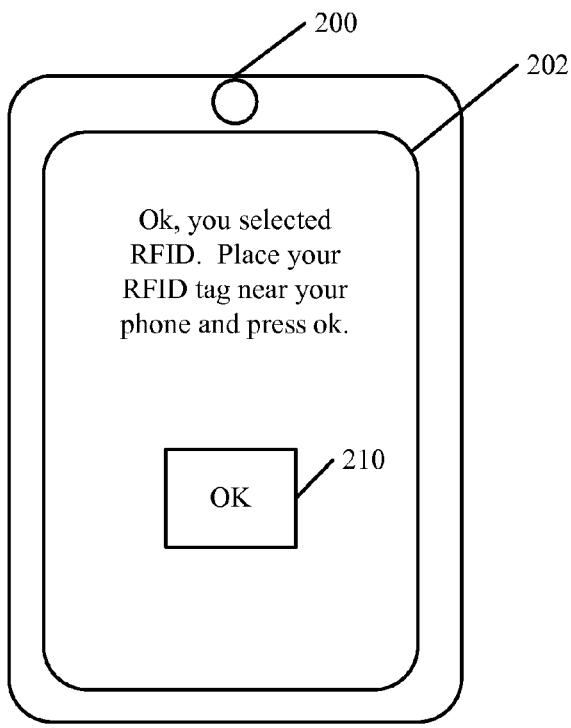
Figure 3H:
Figure 3I:
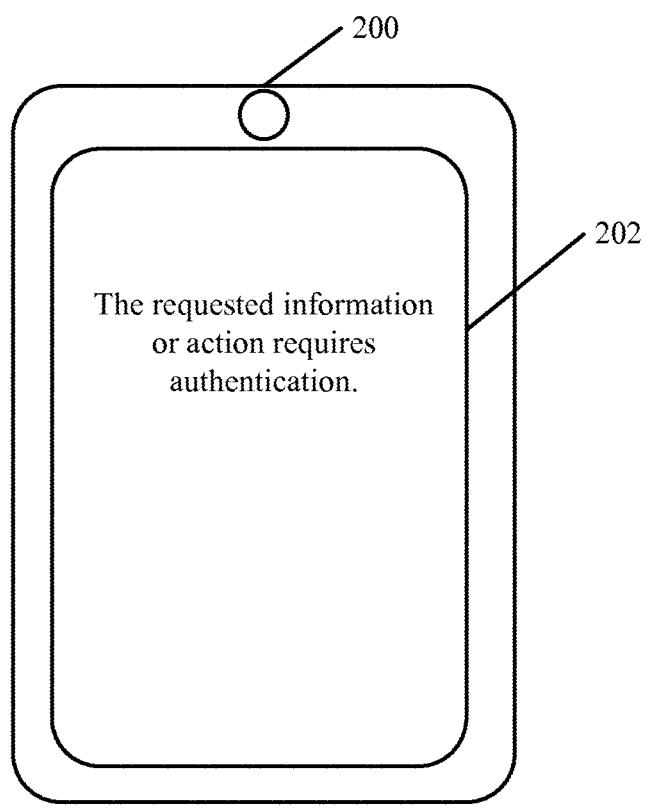

In the embodiment disclosed in FIGS. 3A-3I, the user selects the RFID option 206. FIG. 3G shows a user interface display that instructs the user to place his or her RFID tag near phone 200 so that the RFID information can be read from the user's RFID tag. The user 105 illustratively does this and presses or otherwise actuates OK button 210 shown in FIG. 3G. In accordance with one embodiment, the user is then provided with user interface displays that allow the user to assign the authentication information to various secured areas of phone 200 (such as to actions that can be taken from phone 200, or to information stored or accessible by phone 200, or to applications that can be run on phone 200, etc.).

Once the user has assigned the authentication to the secured areas of phone 200, FIG. 3H shows a user interface display that can be generated explaining that the user has now finished the authentication process.

When the user subsequently attempts to access one of the secured areas of phone 200, but does not have authentication component 104 within the predefined proximity of phone 200, phone 200 illustratively generates an interface display such as that shown in FIG. 3I. This prompts the user that the secured area is in fact secured and that the authentication component 104 is needed to access that secured area.

Of course, it will be noted that the user interface displays shown in FIGS. 3A-3I are exemplary only. A wide variety of other user interface displays could be used. In addition, similar user interface displays can be used where the user selects a different type of authentication option. For instance, if the user selects the keyboard password option, then the user interface display will illustratively instruct the user to enter a password and repeat it. If the user selects a QR code option, the user interface display will illustratively instruct the user to scan the QR code that the user wishes to use for authentication. The same is true of a barcode option. Of course, where other options are selected, the user is instructed in an appropriate way.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device, comprising:
a mobile communication component that communicates over a mobile communication network;
a processor, being a functional part of the mobile device;
a display providing a plurality of selectable options for authentication, the plurality of selectable options comprising a proximity-based authentication option and at least one option other than a proximity-based authentication option, the proximity-based authentication option based on a proximity of a separate, proximity-based authentication component to the mobile device; and
an authentication module wherein in response to a selection of the proximity-based option, the display provides an instruction to bring the proximity-based authentication component near the mobile device and provides a button such that when the button is selected, the authentication module reads authentication information from the proximity-based authentication component that can be assigned to at least one secure area for use during later authentication and wherein after the authentication module reads the authentication information from the proximity-based authentication component, the display further provides a user interface that allows a user to assign the authentication information to a plurality of secured areas.

2. The mobile device of claim 1 wherein the separate, proximity-based authentication component comprises a radio frequency identification (RFID) tag, the mobile device further comprising:
an RFID reader that detects whether the RFID tag is within the predefined proximity by attempting to read the RFID tag.

3. The mobile device of claim 1 wherein the separate, proximity-based authentication component comprises a near field communication (NFC) device, the mobile device further comprising:
an NFC reader that detects whether the NFC device is within the predefined proximity by attempting to communicate with the NFC device.

4. The mobile device of claim 1 wherein the plurality of selectable options further comprises a bar code option.

5. The mobile device of claim 1 wherein the secured area comprises given functionality of the mobile device.

6. The mobile device of claim 1 wherein the secured area comprises given data accessible by the mobile device.

7. The mobile device of claim 6 wherein the secured area comprises one or more given folders accessible by the mobile device.

8. The mobile device of claim 6 wherein the secured area comprises one or more given files accessible by the mobile device.

9. The mobile device of claim 1 wherein the secured area comprises one or more given applications run on the mobile device.

10. The mobile device of claim 1 wherein the secured area comprises given tasks performed with the mobile device.

* * * * *